(12) United States Patent
Schatz et al.

(10) Patent No.: US 12,147,529 B2
(45) Date of Patent: *Nov. 19, 2024

(54) HYBRID MANAGED AND UNMANAGED DATA MODEL

(71) Applicant: Oracle International Corporation, Redwood City, CA (US)

(72) Inventors: Roland Schatz, Linz (AT); Christian Haeubl, Linz (AT); Matthias Grimmer, Aurolzmünster (AT)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,283

(22) Filed: Apr. 20, 2023

(65) Prior Publication Data

US 2023/0259611 A1 Aug. 17, 2023

Related U.S. Application Data

(63) Continuation of application No. 16/722,714, filed on Dec. 20, 2019, now Pat. No. 11,663,321.

(51) Int. Cl.
*G06F 21/00* (2013.01)
*G06F 21/52* (2013.01)
*G06F 21/53* (2013.01)

(52) U.S. Cl.
CPC .............. *G06F 21/52* (2013.01); *G06F 21/53* (2013.01); *G06F 2221/033* (2013.01)

(58) Field of Classification Search
CPC .... G06F 21/52; G06F 21/53; G06F 2221/033; G06F 21/6281; G06F 21/78
See application file for complete search history.

(56) References Cited

U.S. PATENT DOCUMENTS 7,752,242 B1 7/2010 Satish et al.
8,375,443 B1 2/2013 Reis et al.
(Continued)

OTHER PUBLICATIONS

Xi Wang, Nickolai Zeldovich, M. Frans Kaashoek, and Armando Solar-Lezama. 2013. "Towards optimization-safe systems: analyzing the impact of undefined behavior". In ACM SIGOPS 24th Symposium on Operating Systems Principles, SOSP '13, Farmington, PA, USA, Nov. 3-6, 2013. pp. 260-275. https://doi.org/10.1145/2517349.2522728.

(Continued)

*Primary Examiner* — Ghazal B Shehni
(74) *Attorney, Agent, or Firm* — Robert C. Kowert; Kowert, Hood, Munyon, Rankin & Goetzel, P.C.

(57) ABSTRACT

A computer comprising processors and memory may implement an application execution engine to execute an application including both managed code and unmanaged code, the managed code providing memory safety for accesses to objects in memory and the unmanaged code providing no such safety. Responsive to a request from managed code, the application execution engine allocates memory for an object in a managed pool and the object is accessible to managed code in a managed state. Responsive to a requirement for unmanaged code to access the managed object, the application execution engine transforms the object to be accessible in an unmanaged state, the transformation including allocating memory for the object in an unmanaged pool, copying data from managed memory to unmanaged memory according to a predetermined unmanaged layout, releasing the managed memory and using an address of the unmanaged memory to access the object in the unmanaged state.

20 Claims, 10 Drawing Sheets

(56) References Cited

U.S. PATENT DOCUMENTS

| | | | |
|---|---|---|---|
| 8,793,676 B2* | 7/2014 | Quinn | G06F 9/44521 |
| | | | 717/163 |
| 2009/0282477 A1 | 11/2009 | Chen et al. | |
| 2013/0054925 A1* | 2/2013 | Hsia | G06F 11/3604 |
| | | | 711/170 |
| 2018/0129497 A1 | 5/2018 | Biddle et al. | |
| 2018/0316715 A1* | 11/2018 | Liu | H04L 63/1466 |
| 2019/0377883 A1 | 12/2019 | Wasiq et al. | |
| 2020/0104478 A1* | 4/2020 | Chauhan | G06F 21/45 |

OTHER PUBLICATIONS

Matthew Arnold, et al., "Adaptive optimization in the Jalapeño JVM," In Proceedings of the 15th ACM SIGPLAN Conference on Object-oriented Pro-gramming, Systems, Languages, and Applications (OOPSLA '00). ACM, New York, NY, USA, pp. 47-65. https://doi.org/10.1145/353171.353175, 2000.
Edd Barrett, Carl Friedrich Bolz-Tereick, Rebecca Killick, Sarah Mount, and Laurence Tratt. "Virtual Machine Warmup Blows Hot and Cold?". Proc. ACM Program. Lang. 1, OOPSLA, Article 52 (Oct. 2017), 27 pages. https://doi.org/10.1145/3133876, 2017.
Priyam Biswas, Alessandro Di Federico, Scott A. Carr, Prabhu Ra-jasekaran, Stijn Volckaert, Yeoul Na, Michael Franz, and Mathias Payer. 2017. "Venerable Variadic Vulnerabilities Vanquished". In 26th USENIX Security Symposium (USENIX Security 17). USENIX Association, Vancouver, BC, pp. 186-198.
Derek Bruening and Qin Zhao. 2011. "Practical Memory Checking with Dr. Memory". In Proceedings of the 9th Annual IEEE/ACM International Symposium on Code Generation and Optimization (CGO '11). IEEE Computer Society, Washington, DC, USA, pp. 213-223.
Vitaly Chipounov and George Candea. 2010. "Dynamically Translating x86 to LLVM using QEMU". Technical Report EPFL-TR-149975, Ecole Polytechnique Fédérale de Lausanne, Switzerland, Mar. 2010, pp. 1-5.
David Chisnall, et al., "Beyond the PDP-11: Architectural Support for a Memory-Safe C Abstract Machine", In Proceedings of the Twentieth International Conference on Architectural Support for Pro-gramming Languages and Operating Systems (ASPLOS '15). ACM, New York, NY, USA, 117š130. https://doi.org/10.1145/2694344.2694367, 2015, pp. 1-14.
Daniel Clifford, Hannes Payer, Michael Stanton, and Ben L. Titzer. 2015. "Memento Mori: Dynamic Allocation-site-based Optimizations". In Proceedings of the 2015 International Symposium on Memory Management (ISMM '15). ACM, New York, NY, USA, pp. 105-117. https: //doi.org/10.1145/2754169.2754181.
Crispin Cowan, Matt Barringer, Steve Beattie, Greg Kroah-Hartman, Mike Frantzen, and Jamie Lokier. 2001. "FormatGuard: Automatic Protection from Printf Format String Vulnerabilities". In Proceedings of the 10th Conference on USENIX Security Symposium—vol. 10 (SSYM'01). Usenix Association, Berkeley, CA, USA, pp. 1-10.
Santosh Nagarakatte, Jianzhou Zhao, Milo M.K. Martin, and Steve Zdancewic. 2009. "SoftBound: Highly Compatible and Complete Spatial Memory Safety for C". In Proceedings of the 30th ACM SIGPLAN Conference on Programming Language Design and Implementation (PLDI '09). ACM, New York, NY, USA, pp. 245-258. https://doi.org/10.1145/1542476.542504.
Pascal Cuoq, Loïc Runarvot, and Alexander Cherepanov. 2017. "Detecting Strict Aliasing Violations in the Wild". In International Conference on Verification, Model Checking, and Abstract Interpretation. Springer, pp. 14-33.
Dinakar Dhurjati, Sumant Kowshik, and Vikram Adve. "SAFECode: Enforcing Alias Analysis for Weakly Typed Languages,". In PLDI '06: Proceedings of the 2006 ACM SIGPLAN conference on Programming language design and implementation. ACM, New York, NY, USA, 2006, pp. 1-14.

Alessandro Di Federico and Giovanni Agosta. 2016. "A jump-target identification method for multi-architecture static binary translation". In Proceedings of the International Conference on Compilers, Architectures and Synthesis for Embedded Systems. ACM, 17, pp. 1-10.
Stephen Kell. 2016. "Dynamically Diagnosing Type Errors in Unsafe Code". In Proceedings of the 2016 ACM SIGPLAN International Conference on Object-Oriented Programming, Systems, Languages, and Applications (OOPSLA 2016). ACM, New York, NY, USA, pp. 800-819. https://doi.org/10.1145/2983990.2983998.
Vijay D'Silva, Mathias Payer, and Dawn Song. 2015. "The Correctness—Security Gap in Compiler Optimization", In Security and Privacy Work-shops (SPW), 2015 IEEE. IEEE, pp. 73-87.
David Chisnall, et al., 2015. "Beyond the PDP-11: Architectural Support for a Memory-Safe C Abstract Machine". In Proceedings of the Twentieth International Conference on Architectural Support for Programming Languages and Operating Systems (ASPLOS '15). ACM, New York, NY, USA, pp. 117-130. https://doi.org/10.1145/2694344.2694367.
Frank Ch. Eigler. 2003. "Mudflap: Pointer Use Checking for C/C+". Proceedings of the First Annual GCC Developers' Summit (2003), pp. 57-70.
David Evans and David Larochelle. 2002. "Improving Security Using Extensible Lightweight Static Analysis". IEEE Softw. 19, 1 (Jan. 2002), pp. 42-51. https://doi.org/10.1109/52.976940.
Matthias Felleisen and Shriram Krishnamurthi. 1999. "Safety in Programming Languages". Technical Report. Rice University, pp. 1-15.
Stephen J. Fink and Feng Qian. 2003. "Design, Implementation and Evaluation of Adaptive Recompilation with On-stack Replacement". In Proceedings of the International Symposium on Code Generation and Optimization: Feedback-directed and Runtime Optimization (CGO '03). pp. 241-252.
Patrice Godefroid, Michael Y Levin, David A Molnar, et al. 2008. "Auto-mated Whitebox Fuzz Testing," In NDSS, vol. 8. pp. 151-166.
Thomas Würthinger, Christian Wimmer, and Hanspeter Mössenböck. "Array Bounds Check Elimination in the Context of Deoptimization". Science of Computer Programming, 74(5): pp. 279-295, 2009.
Reed Hastings and Bob Joyce. 1991. "Purify: Fast detection of memory leaks and access errors". In proc. of the winter 1992 usenix conference. Citeseer, pp. 125-136.
John L Henning. 2000. "Spec CPU2000: Measuring CPU performance in the new millennium". Computer Practices, Computer 33, 7 (2000 IEEE), pp. 28-35.
Thomas Würthinger, Christian Wimmer, and Hanspeter Mössenböck. Array Bounds Check Elimination for the Java Hotspot™ Client Compiler. In Proceedings of PPPJ '07, pp. 125-133. ACM, 2007.
Urs Hölzle, Craig Chambers, and David Ungar. 1992. "Debugging Optimized Code with Dynamic Deoptimization". In Proceedings of the ACM SIGPLAN 1992 Conference on Programming Language Design and Implementation (PLDI '92). ACM, New York, NY, USA, pp. 32-43. https://doi.org/10.1145/143095.143114.
Urs Hölzle and David Ungar. 1994. "Optimizing Dynamically-Dispatched Calls with Run-time Type Feedback". In Proceedings of the ACM SIG-PLAN 1994 Conference on Programming Language Design and Implementation (PLDI '94). ACM, New York, NY, USA, pp. 326-336. https://doi.org/10.1145/178243.178478.
Gerard J Holzmann. 2002. "Static source code checking for user-defined properties". © 2002 Society for Design and Process Science, In Proceedings of Integrated Design and Process Technology, vol. 2, pp. 1-9.
Intel. [n. d.]. "Intel Inspector 2017". ([n. d.]). https://software.intel.com/en-us/intel-inspector-xe, pp. 1-9.
Trevor Jim, J. Greg Morrisett, Dan Grossman, Michael W. Hicks, James Cheney, and Yanling Wang. Nov. 2001, "Cyclone: A Safe Dialect of C". In Proceedings of the General Track of the Annual Conference on USENIX Annual Technical Conference (ATEC '02). USENIX Association, Berkeley, CA, USA, pp. 275-288.
Brittany Johnson, Yoonki Song, Emerson Murphy-Hill, and Robert Bowdidge. 2013. "Why Don't Software Developers Use Static

(56) References Cited

OTHER PUBLICATIONS

Analysis Tools to Find Bugs?". In Proceedings of the 2013 International Conference on Software Engineering (ICSE '13). IEEE Press, Piscataway, NJ, USA, pp. 672-681.
Stephen Kell. "Dynamically Diagnosing Type Errors in Unsafe Code," In Proceedings of the 2016 ACM SIGPLAN International Conference on Object-Oriented Programming, Systems, Languages, and Applications (OOPSLA 2016). ACM, New York, NY, USA, pp. 800-819. https://doi.org/ 10.1145/2983990.2983998, 2016.
Thomas Kotzmann, Christian Wimmer, Hanspeter Mössenböck, Thomas Rodriguez, Kenneth Russell, and David Cox. 2008. "Design of the Java HotSpot™ client compiler for Java 6". ACM Transactions on Architecture and Code Optimization, vol. 5, Issue 1, May 2008 Article No. 7, pp. 1-32.
Chris Lattner. 2011. "What Every C Programmer Should Know About Undefined Behavior". (2011). http://blog.llvm.org/2011/05/what-every-c-programmer-should-know.html, pp. 1-9.
M. Rigger. "Sandboxed Execution of C and Other Unsafe Languages on the Java Virtual Machine". In Conference Companion of the 2nd International Conference on Art, Science, and Engineering of Programming, pp. 227-229. ACM 2018 http://ssw.jku.at/General/Staff/ManuelRigger/Programming18-SRC.pdf.
Tongping Liu, Charlie Curtsinger, and Emery D. Berger. 2016. "DoubleTake: Fast and Precise Error Detection via Evidence-based Dynamic Analysis". In Proceedings of the 38th International Conference on Software Engineering (ICSE '16). ACM, New York, NY, USA, pp. 911-922. https://doi.org/10.1145/2884781.2884784.
J. Martin and H. A. Muller. 2001. "Strategies for Migration from C to Java". In Proceedings Fifth European Conference on Software Maintenance and Re-engineering. pp. 200-209. https://doi.org/10.1109/.2001.914988.
Michael Matz, Jan Hubicka, Andreas Jaeger, and Mark Mitchell. Oct. 2013. "System V Application Binary Interface". AMD64 Architecture Processor Supplement, Draft v0 99 (2013), pp. 1-128.
John Regehr. 2010. "A Guide to Undefined Behavior in C and C++", (2010). https://blog.regehr.org/archives/213, pp. 1-27.
Thomas Würthinger, Christian Wimmer, Christian Humer, Andreas Wöß, Lukas Stadler, Chris Seaton, Gilles Duboscq, Doug Simon, and Matthias Grimmer. 2017. "Practical Partial Evaluation for High-performance Dynamic Language Runtimes". In Proceedings of the 38th ACM SIGPLAN Conference on Programming Language Design and Implementation (PLDI 2017). ACM, New York, NY, USA, pp. 662-676. https://doi.org/10.1145/3062341.3062381.
Manuel Rigger. 2017. "Clang-O0 performs optimizations that undermine dynamic bug-finding tools" (LLVM Developers Mailing List). (2017). http://lists.llvm.org/pipermail/llvm-dev/2017-March/111371.html, pp. 1-2.
Manuel Rigger. 2017. "Asan does not detect out-of-bounds accesses to argv #762". (2017). https://github.com/google/sanitizers/issues/762, pp. 1-4.
Nicholas Nethercote and Julian Seward. 2007. "Valgrind: A Framework for Heavyweight Dynamic Binary Instrumentation". In Proceedings of the 28th ACM SIGPLAN Conference on Programming Language Design and Implementation (PLDI '07). ACM, New York, NY, USA, pp. 89-100. https://doi.org/10.1145/1250734.1250746.
Painter Engineering. [n. d.]. "C Converted Whetstone Double Precision Benchmark," Version 1.2, Mar. 1998, ([n. d.]). http://www.netlib.org/benchmark/whetstone.c, pp. 1-7.
"Parasoft Insure++," 2021, https://www.parasoft.com/product/insure/, pp. 1-5.
Konstantin Serebryany, Derek Bruening, Alexander Potapenko, and Dmitriy Vyukov. 2012. "AddressSanitizer: A Fast Address Sanity Checker". In USENIX Annual Technical Conference. pp. 309-318.
Manuel Rigger. 2017. "Add an interceptor for strtok," (2017), https://reviews.llvm.org/rL298650, pp. 1-8.
Manuel Rigger. 2017. "Asan does not detect ouf-of-bounds read in strtok #766," (2017), https://github.com/google/sanitizers/issues/766, pp. 1-3.

GCC Wiki. 2014. "Mudflap Pointer Debugging,". (2014). https://gcc.gnu.org/wiki/Mudflap_Pointer_Debugging, pp. 1-3.
Christian Wimmer and Thomas Würthinger. 2012. "Truffle: A Self-optimizing Runtime System". In Proceedings of the 3rd Annual Conference on Systems, Programming, and Applications: Software for Humanity (SPLASH '12). pp. 13-14. https://doi.org/10.1145/2384716.2384723.
Julian Seward and Nicholas Nethercote. 2005. "Using Valgrind to Detect Undefined Value Errors with Bit-Precision". In USENIX Annual Technical Conference, General Track. pp. 17-30.
M. Rigger, M. Grimmer, H Mössenböck. "Sulong: Execution of LLVM-Based Languages on the JVM". In Proceedings of the 11th Workshop on Implementation, Compilation, Optimization of Object-Oriented Languages, Programs and Systems. Article 7. IEEE, 2016, pp. 1-4.
M. Rigger, M. Grimmer, H Mössenböck. "Sulong: Memory Safe and Efficient Execution of LLVM-Based Languages". In Proceedings of the 11th Workshop on Implementation, Compilation, Optimization of Object-Oriented Languages, Programs and Systems. Article 7. IEEE, 2016, pp. 1-8.
M. Rigger, R. Schaltz, R. Mayrhofer, M. Grimmer, H Mössenböck. "Sulong, and Thanks For All the Bugs". In Proceedings of the Twenty-Third International Conference on Architectural Support for Programming Languages and Operating Systems, pp. 377-391. IEEE, 2018.
V. Bala, E. Duesterwald, and S. Banerjia. "Dynamo: A Transparent Dynamic Optimization System". In Proceedings of the ACM SIGPLAN 2000 Conference on Programming Language De-sign and Implementation, PLDI '00, pp. 1-12, New York, NY, USA, 2000. ACM. doi: 10.1145/349299.349303. URL http://doi.acm.org/10.1145/349299.349303.
B. Calder, P. Feller, and A. Eustace. "Value Profiling". In Microarchitecture, 1997. Proceedings., Thirtieth Annual IEEE/ACM International Symposium on, pp. 259-269. IEEE, 1997.
Center for Assured Software. "Juliet Test Suite v1.2 for C/C++,". Technical report, National Security Agency, 2012. pp. 1-41.
G. Duboscq, et al., "An Intermediate Representation for Speculative Optimizations in a Dynamic Compiler" . In Proceedings of the 7th ACM Workshop on Virtual Machines and Intermedi-ate Languages, VMIL '13, pp. 1-10, New York, NY, USA, 2013. ACM, doi: 10.1145/2542142.2542143, URL: http://doi.acm.org/10.1145/2542142.2542143.
M. Grimmer, et al., TruffleC: Dynamic execution of c on a java virtual machine. In Proceedings of the 2014 International Conference on Principles and Practices of Programming on the Java Platform: Virtual Machines, Languages, and Tools, PPPJ '14, pp. 17-26, New York, NY, USA, 2014. ACM, doi: 10.1145/2647508.2647528. URL: http://doi.acm.org/10.1145/2647508.2647528.
M. Grimmer, et al., "Memory-safe Execution of C on a Java VM," In Proceedings of the 10th ACM Workshop on Programming Languages and Analysis for Security, PLAS'15, pp. 16-27, New York, NY, USA, 2015a. ACM. doi: 10.1145/2786558.2786565, URL: http://doi.acm.org/10.1145/2786558.2786565.
M. Grimmer, et all, "High-Performance Cross-Language Interoperability in a Multi-language Runtime," In Proceedings of the 11th Symposium on Dynamic Languages, DLS 2015, pp. 78-90, New York, NY, USA, 2015b. ACM. doi: 10.1145/2816707. 2816714, URL http://doi.acm.org/10.1145/2816707. 2816714.
M. Grimmer, et al., "Dynamically Composing Languages in a Modular Way: Supporting C Extensions for Dynamic Languages". In Proceedings of the 14th International Conference on Modularity, Modularity 2015, pp. 1-13, New York, NY, USA, 2015c. ACM. doi: 10.1145/2724525.2728790. URL http://doi.acm.org/10.1145/2724525.2728790.
Holzle, C. Chambers, and D. Ungar. "Optimizing Dynamically-Typed Object-Oriented Languages With Polymorphic Inline Caches". In ECOOP'91 European Conference on Object-Oriented Programming, pp. 21-38. Springer, 1991.
Attner and V. Adve, "LLVM: a compilation framework for life-long program analysis transformation". In Code Generation and Optimization, 2004. CGO 2004. International Symposium on, pp. 75-86, Mar. 2004. doi: 10.1109/CGO.2004.1281665.

(56) References Cited

OTHER PUBLICATIONS

NIST. "National Vulnerability Database", 2016. URL https://web.nvd.nist.gov/view/vuln/search, pp. 1-3.

Nuzman, et al., "JIT Technology with C/C++: Feedback-Directed Dynamic Recompilation for Statically Compiled Languages,". ACM Trans. Archit. Code Optim., 10(4):59: pp. 1-59, Dec. 2013. ISSN 1544-3566. doi: 10.1145/2541228.2555315. URL http://doi.acm.org/10.1145/2541228.2555315.

L. Szekeres, M. Payer, T. Wei, and D. Song. "SoK: Eternal War in Memory," In Proceedings of the 2013 IEEE Symposium on Security and Privacy, SP '13, pp. 48-62, Washington, DC, USA, 2013. IEEE Computer Society. doi: 10.1109/SP.2013.13. URL http://dx.doi.org/10.1109/SP.2013.13.

S-A.-A. Touati and D. Barthou. "On the decidability of phase ordering problem in optimizing compilation". In Proceedings of the 3rd conference on Computing frontiers, pp. 147-156. ACM, 2006.

Victor Van Der Veen, N. Dutt Sharma, L. Cavallaro, and H. Bos. "Memory Errors: The Past, the Present, and the Future," In Proceedings of the 15th International Conference on Research in Attacks, Intrusions, and Defenses, RAID'12, pp. 86-106, Berlin, Heidelberg, 2012. Springer-Verlag. 2012.

T. Wurthinger, et al.. "Self-optimizing ASY interpreters". In Proceedings of the 8th Symposium on Dynamic Languages, DLS '12, pp. 73-82, New York, NY, USA, 2012. ACM. doi: 10.1145/2384577.2384587. URL http://doi.acm.org/10.1145/2384577. 2384587.

T. Wurthinger, et al., "One VM to Rule Them All," In Proceedings of the 2013 ACM International Symposium on New Ideas, New Paradigms, and Reflections on Programming & Software, Onward! 2013, pp. 187-204, New York, NY, USA, 2013. ACM. doi: 10.1145/2509578.2509581, URL: http://doi.acm.org/10.1145/2509578.2509581.

Stephen Cass, "The 2015 Top Ten Programming Languages". IEEE Spectrum, pp. 1-3, 2015.

Vitaly Chipounov and George Candea. "Dynamically Translating x86 to LLVM using QEMU," Technical Report EPFL-TR-149975, Ecole Polytechnique Fédérale de Lausanne, Switzerland, Mar. 2010, pp. 1-5.

Cliff Click, "Global Code Motion / Global Value Numbering," In ACM SIGPLAN Notices, vol. 30, pp. 246-257, 1995.

Standard Performance Evaluation Corporation, "Cint2006 (integer component of spec cpu2006)," https://www.spec.org/cpu2006/CINT2006/, pp. 1-3 2006.

Crispin Cowan, Perry Wagle, Calton Pu, Steve Beattie, and Jonathan Walpole. "Buffer Overflows: Attacks and Defenses for the Vulnerability of the Decade". In DISCEX'00. Proceedings, vol. 2, pp. 119-129, 2000.

Thurston HY Dang, Petros Maniatis, and David Wagner. "The performance cost of shadow stacks and stack canaries". In Proceedings of ASIACCS 2015, pp. 555-566, 2015.

Artem Dinaburg and Andrew Ruef. "McSema: Static Translation of X86 Instructions to LLVM". In ReCon 2014 Conference, Montreal, Canada, 2014.

Gilles Duboscq, Thomas Würthinger, and Hanspeter Mössenböck. "Speculation Without Regret: Reducing Deoptimization Meta-data in the Graal compiler". In Proceedings of PPPJ '14, pp. 187-193, 2014.

Andreas Wöß, et al., "An Object Storage Model for the Truffle Language Implementation Framework,". In 2014 International Conference on Principles and Practices of Programming on the Java Platform Virtual Machines, Languages and Tools, PPPJ '14, Cracow, Poland, Sep. 23-26, 2014. pp. 133-144. https://doi.org/10.1145/2647508.2647517.

Xi Wang, Haogang Chen, Alvin Cheung, Zhihao Jia, Nickolai Zel-dovich, and M. Frans Kaashoek. 2012. "Undefined behavior: what happened to my code?". APSYS '12: Proceedings of the Asia-Pacific Workshop on Systems, Jul. 2012, Article No. 9, pp. 1-6.

Manuel Rigger, Roland Schatz, Rene Mayrhofer, Matthias Grimmer, and Hanspeter Mössenböck. 2018. "Introspection for C and its Applications to Library Robustness". The Art, Science, and Engineering of Programming vol. 2, Issue 2, Article 4, pp. 1-31 (2018).

Geoffrey Smith and Dennis M. Volpano. 1998. "A Sound Polymorphic Type System for a Dialect of C". Sci. Comput. Program. 32, No. 2-3 (1998), pp. 49-72. https://doi.org/10.1016/S0167-6423(97)00030-0.

Matthias Grimmer, Roland Schatz, Chris Seaton, Thomas Würthinger, and Hanspeter Mössenböck. "Memory-safe Execution of C on a Java VM". PLAS'15, pp. 16-27, 2015.

Chris Lattner and Vikram Adve. "The LLVM Instruction Set and Compilation Strategy," CS Dept., Univ. of Illinois at Urbana-Champaign, Tech. Report UIUCDCS, 2002, pp. 1-20.

Kayvan Memarian, Justus Matthiesen, James Lingard, Kyndylan Nien-huis, David Chisnall, Robert N. M. Watson, and Peter Sewell. 2016. "Into the Depths of C: Elaborating the De Facto Standards". In Proceedings of the 37th ACM SIGPLAN Conference on Programming Language Design and Implementation, PLDI 2016, Santa Barbara, CA, USA, Jun. 13-17, 2016. pp. 1-15. https://doi.org/10.1145/2908080.2908081.

Santosh Nagarakatte, Jianzhou Zhao, Milo MK Martin, and Steve Zdancewic. "CETS: Compiler Enforced Temporal Safety for C". In ACM SIGPLAN Notices, vol. 45, pp. 31-40, 2010.

Manuel Rigger, Matthias Grimmer, Christian Wimmer, Thomas Würthinger, and Hanspeter Mössenböck. 2016. "Bringing Low-Level Languages to the JVM: Efficient Execution of LLVM IR on Truffle," In Proceedings of the 8th International Workshop on Virtual Machines and Intermediate Languages (VMIL 2016). ACM, New York, NY, USA, pp. 6-15.

Common Weakness Enumeration, "2010 CWE/SANS Top 25 Most Dangerous Software Errors", (c) The MITRE Corporation, pp. 1-47, 2010.

Hovav Shacham, et al., "On the Effectiveness of Address-Space Randomization," In Proceedings of the CCS '04, pp. 298-307, 2004.

Bor-Yeh Shen, Jiunn-Yeu Chen, Wei-Chung Hsu, and Wuu Yang, "An LLVM-based Hybrid Binary Translation System,". CASES '12: Proceedings of the 2012 international conference on Compilers, architectures and synthesis for embedded systems, Oct. 2012, pp. 51-60.

Richard L Sites, Anton Chernoff, Matthew B Kirk, Maurice P Marks, and Scott G Robinson, "Binary translation," Communications of the ACM, vol. 36, Issue 2, Feb. 1993, pp. 139-152.

Lukas Stadler, Gilles Duboscq, Hanspeter Mössenböck, Thomas Würthinger, and Doug Simon, "An Experimental Study of the Influence of Dynamic Compiler Optimizations on Scala Performance," In Proceedings of the 4th Workshop on Scala, pp. 1-9, ACM 2013.

Lukas Stadler, Thomas Würthinger, and Hanspeter Mössenböck. "Partial Escape Analysis and Scalar Replacement for Java," CGO '14: Proceedings of Annual IEEE/ACM International Symposium on Code Generation and Optimization, Feb. 2014, pp. 165-174.

John Rose. 2014. "JEP 243: Java-Level JVM Compiler Interface,". (2014), Oracle Corporation, http://openjdk.java.net/ieps/243, pp. 1-2.

George C. Necula, Jeremy Condit, Matthew Harren, Scott McPeak, and Westley Weimer, "CCured: Type-Safe Retrofitting of Legacy Software," ACM Transactions on Programming Languages and Systems, vol. 27, No. 3, May 2005, pp. 477-526.

Thomas Würthinger, Christian Wimmer, and Hanspeter Mössenböck. "Array Bounds Check Elimination for the Java HotSpot(TM) Client Compiler". In Proceedings of the 5th International Symposium on Princi-ples and Practice of Programming in Java, PPPJ 2007, Lisboa, Portugal, Sep. 5-7, 2007. pp. 125-133. https://doi.org/10.1145/1294325.1294343.

Santosh Nagarakatte, et al., CETS: compiler enforced temporal safety for C. In Proceedings of the 9th International Symposium on Memory Management, ISMM 2010, Toronto, Ontario, Canada, Jun. 5-6, 2010. pp. 31-40. https://doi.org/10.1145/1806651.1806657.

Yves Younan, Wouter Joosen, and Frank Piessens, "Runtime countermeasures for code injection attacks against C and C++ programs," ACM Computing Surveys, vol. 44, Issue 3, Jun. 2012, Article No. 17, pp. 1-28.

\* cited by examiner

HYBRID MANAGED AND UNMANAGED DATA MODEL

BACKGROUND

This application is a continuation of U.S. patent application Ser. No. 16/722,714, filed Dec. 20, 2019, which is hereby incorporated by reference herein in its entirety.

FIELD OF THE DISCLOSURE

This disclosure relates generally to the execution of computer applications, and more particularly to systems and methods for executing applications containing both managed code and unmanaged code.

DESCRIPTION OF THE RELATED ART

Modern computer application development languages fall into two broad categories, languages supporting unmanaged code, such as C and C++, and languages supporting managed code, such as Java™, C#, R, Python and Ruby. Unmanaged code may suffer from various well known issues, for example memory access vulnerabilities such as buffer overflows, which when not caught may result in undefined behaviors and security vulnerabilities. Existing approaches to mitigate these risks include inserting runtime checks in applications to catch violations and coding errors but these checks are inherently imprecise in the sense that a missing check might lead to an undetected security vulnerability.

Managed code, on the other hand, uses a combination of language features and the assistance of a runtime environment for the application to mitigate risks generally associated with unmanaged code. Applications developed using languages and toolsets supporting managed code are therefore considered memory-safe.

It is impractical, however, to simply replace unmanaged code with managed code in order to receive such memory safety benefits as an enormous body of software has been developed using unmanaged code. On the other hand, unmanaged code may be compiled with improved tools such that the resulting application uses a runtime environment similar, or identical, to that of managed code. Using this approach, data objects defined by the unmanaged code are translated and stored using managed memory allocations. This approach results in sandboxed execution of the unmanaged code, and with sandboxed execution memory accesses in the unmanaged code receive the benefits of memory safety.

Sandboxed execution, however, by virtue of utilizing the runtime environment of managed code, is generally unable to interact with unmanaged code that has been compiled to execute natively rather than in sandboxed mode, as the memory model for the two execution environments is entirely different.

Disclosed herein is a hybrid execution environment for applications that utilize both managed code and unmanaged code. In this hybrid environment, in-memory data objects can be in one of two states: managed or unmanaged. When allocating an object from managed code, objects are allocated in the Managed State with information recorded describing the layout of the object in the Unmanaged State. Within unmanaged code using sandboxed execution, all accesses to the objects are memory-safe. However, if an object in Managed State is passed to non-sandboxed native code, it is first transformed to the Unmanaged State. Once transformed, the original managed object is rewritten as a simple pointer to the unmanaged memory. This native pointer can then be passed to non-sandboxed code. Existing references to the managed object, including from sandboxed code, then have to access the object contents via this pointer.

SUMMARY

Methods, techniques and systems implementing an application execution engine for executing an application including both managed code and unmanaged code are described, with the managed code providing memory safety for accesses to objects in memory and the unmanaged code providing no such memory safety. During execution of the application and responsive to a request from managed code of the application, the application execution engine creates an object in a Managed State by allocating memory for an object in a managed pool, creating a managed layout for the object in the managed memory, generating an unmanaged data layout template and making the object accessible to managed code in a Managed State providing memory safety. Responsive to a requirement for unmanaged code to access the created object accessible in the Managed State, the application execution engine transforms the object to be accessible in an Unmanaged State, the transformation including allocating unmanaged memory for the object in an unmanaged pool, copying data from managed memory to unmanaged memory according to a unmanaged data layout template, making the managed memory available for reuse and using an address of the unmanaged memory to access the object in the Unmanaged State.

Figure 1:
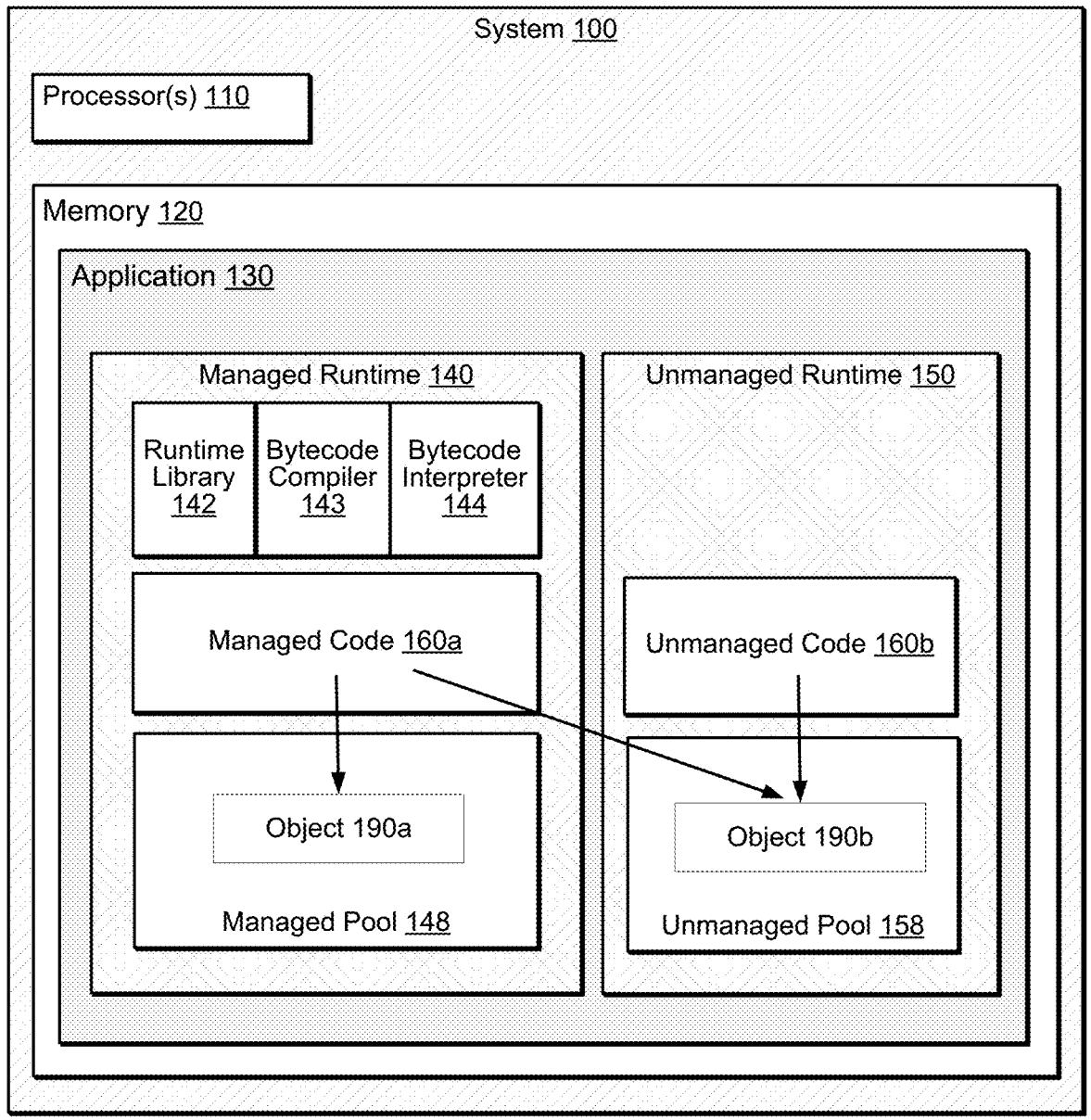
FIG. 1 is a block diagram illustrating a system implementing an application that includes both managed and unmanaged code.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Modern applications are frequently implemented using managed code and managed data models. This approach allows for a combination of source language and runtime features that enhance memory safety and application security. A wide variety of source languages, including for example the Java™ programming language, have been designed specifically to provide these safety features, but it is also possible to adapt source code written in unmanaged languages, such as C and C++, to execute in a managed environment using managed data models. This approach offers advantages including memory safety and interoperability with managed languages like R, Python or Ruby but is not binary compatible with existing native code.

Disclosed herein is an application execution environment including a hybrid data model that retains the advantages of managed data models, where possible, while allowing transition to a binary-compatible representation when necessary for interoperating with natively compiled, unmanaged code. This enables development of memory-safe applications that are capable of integrating with legacy code where source for the legacy code is not available to the application developer.

The hybrid data model defines data layouts and access for data objects that exist in one of two states: a Managed State and an Unmanaged State. Initial allocation of an object may be performed in a Managed State and, additionally, information is kept regarding the layout of the object should it be transformed into an Unmanaged State. Source code developed in an unmanaged language, such as C or C++, and compiled to execute within a Managed Runtime, is executed as sandboxed code where data object accesses, though written to be performed as unmanaged accesses, may be performed in the Managed State and receive the benefits of memory safety.

If a data object in a Managed State is passed to non-sandboxed unmanaged code, it must first be transformed to an Unmanaged State. At that point, memory is allocated from an unmanaged memory pool and an unmanaged representation of the object is constructed from the state of the managed object using predetermined layout information contained in a data layout template. Such a transformation may recursively trigger other managed objects to transform to an Unmanaged State as well. The original managed object is then rewritten to include a simple address to the allocated unmanaged memory and may also include additional metadata in some embodiments. This address can then be passed to non-sandboxed unmanaged code. Subsequent references to the managed object must then occur in an Unmanaged State unless and until a reverse transformation occurs. This hybrid approach provides memory safety where possible but remains interoperable with native unmanaged code libraries where source code is unavailable.

FIG. 1 is a block diagram illustrating a system implementing an application execution engine that executes an application including both managed and unmanaged code. The System 100 includes one or more Processors 110 capable executing an Application 130 contained in Memory 120, where the Application 130 may include both a Managed Runtime 140 and an Unmanaged Runtime 150. The Managed Runtime 140 may execute within a Virtual Machine (not shown) in some embodiments and may include a Runtime Library 142 a Bytecode Executive that may further include a Bytecode Compiler 143 and Bytecode Interpreter 144 for executing the Managed Bytecode of Managed Code 160a, as detailed further below in FIG. 2. In addition, the Managed Runtime 140 may include a Managed Pool 148 to support Objects 190a created in a Managed State. The Unmanaged Runtime 150 may include Unmanaged Code 160b and Unmanaged Pool 158 to support Objects 190b created in an Unmanaged State.

Figure 2:
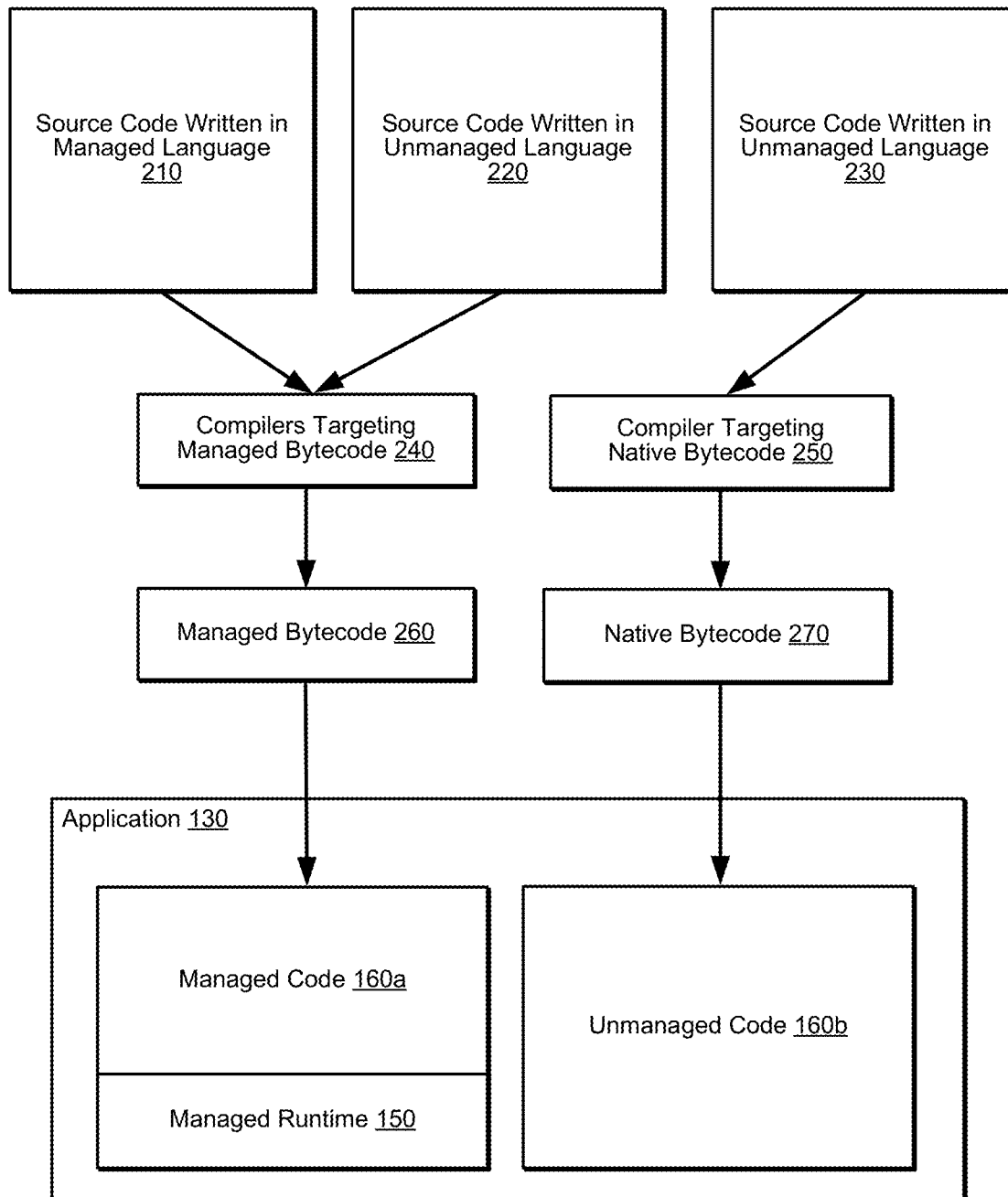
FIG. 2 is a flow diagram illustrating one embodiment of a method for building an application that includes both managed and unmanaged code.

FIG. 2 is a block diagram illustrating a process for developing an Application 130 that includes both Managed Code 160a and Unmanaged Code 160b. The source code for the application may include source code written in a managed language 210 such as Java™ or C#. The source code for the application may also include source code written in an unmanaged language 220 and 230 such as such as C or C++. Source code written in an unmanaged language may be compiled using a compiler targeting managed bytecode 240 or it may be compiled using a compiler targeting native bytecode 250 while source code written in an managed language may be compiled using a compiler targeting managed bytecode 240. A compiler targeting native bytecode 250 produces Native Bytecode 270 which results in Unmanaged Code 160b within the Application 130. A compiler targeting managed bytecode 240 produces Managed Bytecode 260 which results in Managed Code 160a within the Application 130. The Managed Code 160a and Unmanaged Code 160b, in combination with a Managed Runtime 140 discussed above, collectively implement the Application 130. It should be understood that the various compilers 240 and 250 may, in some embodiments, be distinct compilers implemented as separate software development tools or applications while in other embodiments these compilers may be implemented using one or more common software development tools or applications. For example, in some embodiments source code written in an unmanaged language 220 and 230 may be compiled using compilers targeting managed bytecode 240 and unmanaged bytecode 250 respectively where these compilers are implemented within a common software development application. Similarly, in some embodiments source code written in a managed language 210 and an unmanaged language may be compiled using compilers targeting managed bytecode 240 where these compilers are implemented within a common software development application. These compilers 240 and 250 may be implemented in a variety of ways using a variety of software development tools or applications and the implementations described above are merely examples and are not intended to be limiting.

Figure 3:
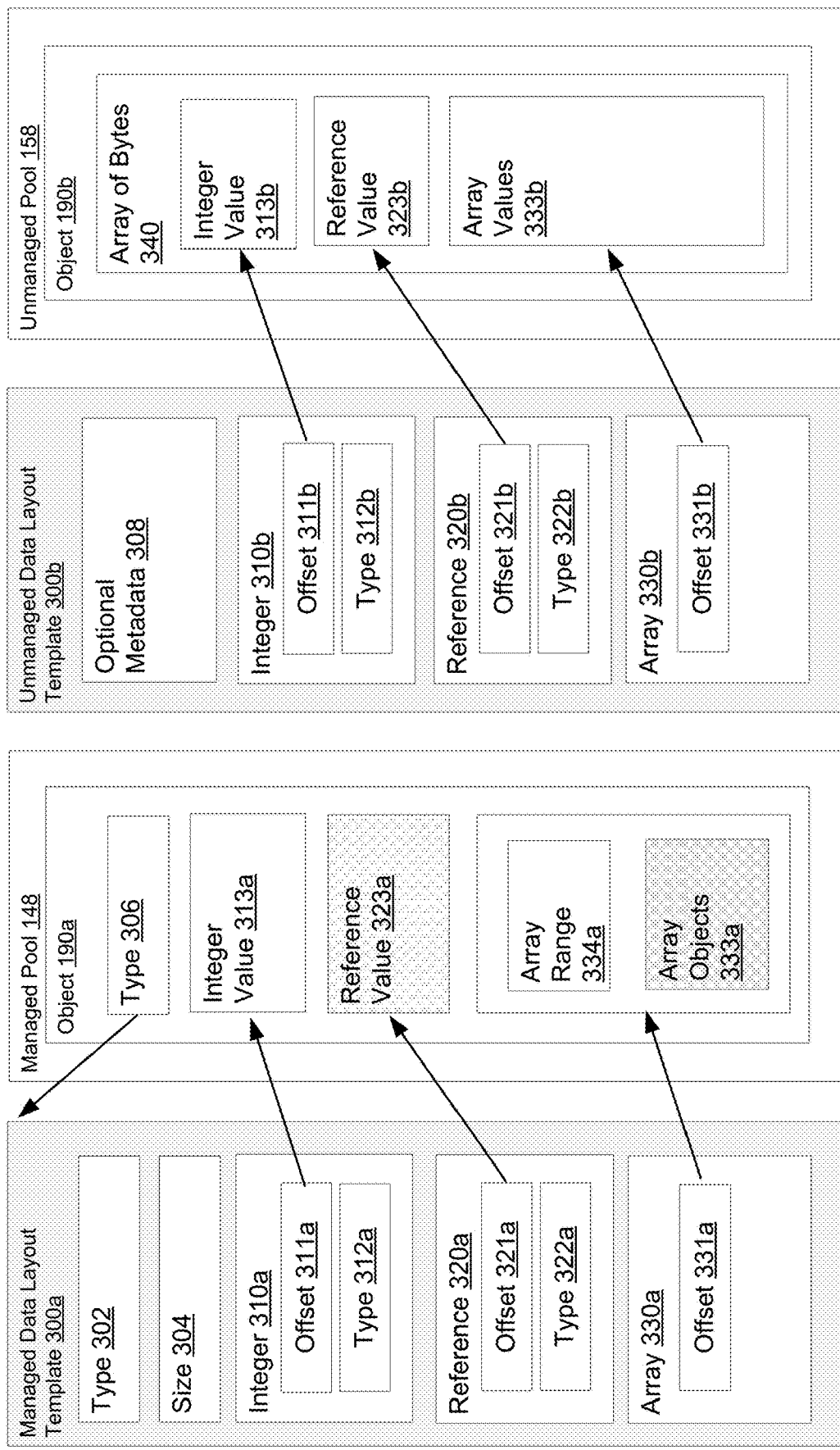
FIG. 3 is a block diagram illustrating a managed data template and a corresponding unmanaged data template for an object according to some embodiments.

FIG. 3 is a block diagram illustrating a Managed Data Template 300a and a corresponding Unmanaged Data Template 300b for an Object 190 according to some embodiments. An Application 130 may create an Object 190 consisting of one or more elements including primitive elements such as bytes, integers, floating point numbers, addresses and so on. In addition, the Object 190 may also consist of other objects, arrays of objects and so on. Examples of such elements may include Integer 310, Reference 320 and Array 330, although objects may include any number and type of elements and the above are merely examples and are not intended to be limiting.

Each element of the Object 190 has a corresponding entry in the Managed Data Template 300a and Unmanaged Data Template 300b. In the Managed Data Template 300a, an element may have a corresponding type and offset into memory for the Object 190a allocated from the Managed Pool 148 to store the value of the element, such as in the integer Offset 311a and Type 312a, array Offset 331a and reference Offset 321a and Type 322a. In addition, the Managed Data Layout Template 300a may contains metadata including an object Type 302 and Size 304.

An Object 190 may also contain objects or arrays of objects such as Array element 330 which has corresponding Objects 333a as well as Array Range metadata 334a. The Range metadata 334a may contain the number of elements in the array of objects stored in the Array Objects 333a. It should be noted that while metadata of the Array element 330 is illustrated as Array Range 334a, additional metadata for each object in the Array Objects 333a may be stored as described in the managed data template of the individual objects of the Array 340.

The Managed Runtime 140 may use the metadata associated with individual elements to implement memory safety. For example, the Managed Runtime 140 may use the Array Range 334a of Array 330 to perform bounds checking on accesses to the Array Objects 333a in order to detect out of range conditions that might otherwise lead to memory corruption.

Each element of the Object 190 may have a corresponding entry in the Unmanaged Data Template 300b. These entries correspond to the native storage requirements of the Object 190b allocated in the Unmanaged Pool 158, such as for Integer Value 313b, Reference Value 323b and Array Values 333b, as defined in the binary interface of the Unmanaged Code 160b. These corresponding entries may include offsets into the Object 190b, such as Integer Offset 311b, Reference Offset 321b and Array Offset 331b, as well as indicators of data types of the respective elements such as Integer Type 312b and Reference Type 332b. In addition, the Unmanaged Data template 300b may contain Optional Metadata 308 which may contain additional information describing aspects of unmanaged data layout for the Object 190. For example, the Optional Metadata 308 may contain information identifying the application binary interface standard supported in the unmanaged data layout or may contain information such as data alignment requirements for the object 190b.

An Application 130 implementing the Object 190 may transition between managed data and unmanaged data representations of the object using templates 300a and 300b. While some elements, such as Integer 310 and Reference 320, may have values that directly correspond in the managed and unmanaged data templates, such as Integer Value 313a and Integer Value 313b as well as Reference Value 323a and Reference Value 323b, other elements may not have values that directly correspond in the managed and unmanaged data templates, such as Array 330. This is due to individual objects of the Array 330 containing both values and metadata stored in the Array Objects 333a in the Managed Data Template 300a whereas the Array Values 333b may store values but not store corresponding object metadata.

It should be understood that the various elements and metadata described above are merely examples of elements of an Object 190 and are not intended to be limiting. Indeed, a variety of metadata supporting memory safety for objects may be envisioned and the above examples are intended only to be illustrative of the need for object metadata in a managed representation of an Object 190 and the resulting differences between managed and unmanaged representations of an Object 190.

Figure 4A:
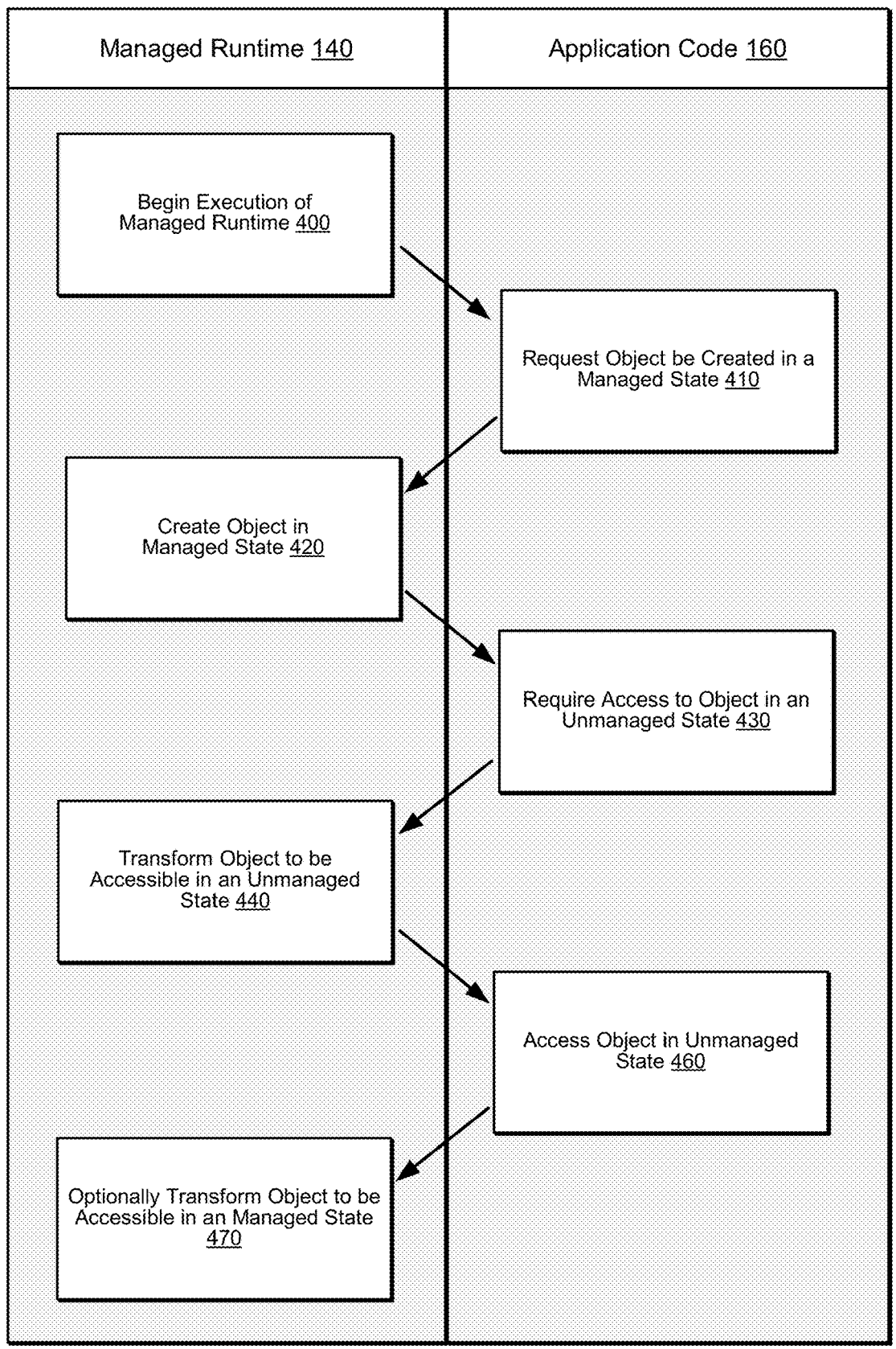
FIG. 4A-F are flow diagrams illustrating one embodiment of a method for allocating and managing a data object for an application that includes both managed and unmanaged code.

FIG. 4A-F are flow diagrams illustrating a method for allocating and managing a data object for an application that includes both managed and unmanaged code according to some embodiments. FIG. 4A is a flow diagram illustrating one embodiment of a method for creating and managing an object in an application using the hybrid data model described herein.

The method starts at step 400 where the Managed Runtime 140 initializes and begins execution, including execution of the Application Code 160. The Application Code 160 then requests that an Object 190 be created in a Managed State in step 410. This request may be made as part of initial startup of the Application Code 160 or at any time during execution of the Application 130. Responsive to this request, the Managed Runtime 140 creates the Object 190a in a Managed State at step 420. This creation is further detailed in FIG. 4B below. After creation of the Object 190a in a Managed State, the Application 130 may access the Object 190 using Managed Code 160a with the benefits of memory safety. Subsequent to the creation of the Object 190a in a Managed State, the Application Code 160 determines in step 430 that access to the Object 190, currently in a Managed State 190a, is required in an Unmanaged State by Unmanaged Code 160b. Responsive to this determination, the Managed Runtime 140 transforms the Object 190 to be accessible in an Unmanaged State in step 440. This transformation is further detailed in FIG. 4C below. After transformation of the Object 190 to an Unmanaged State, the Application 130 may access the Object 190b in step 460 using both Managed Code 160a and Unmanaged Code 160b. Furthermore, access to the Object in a Managed State 190a by Managed Code 160a is not allowed. Subsequent to the transformation of the Object 190 to an Unmanaged State 190b, the Application 130 performs the determined access to the Object 190 using Unmanaged Code 160b in step 460. In some embodiments, after access to the Object 190 in an Unmanaged State is complete, the Object may be transformed to be accessible in a Managed State in step 470. This transformation may occur responsive to completion of the access in an Unmanaged State in some embodiments or responsive to a request to access the Object 190 in a Managed State in other embodiments. This transformation is further detailed in FIG. 4E below. In still other embodiments, once the Object 190 has been transformed to be accessible in an Unmanaged State, the Object remains accessible in an Unmanaged State and is not subsequently transformed to be accessible in a Managed State.

Figure 4B:
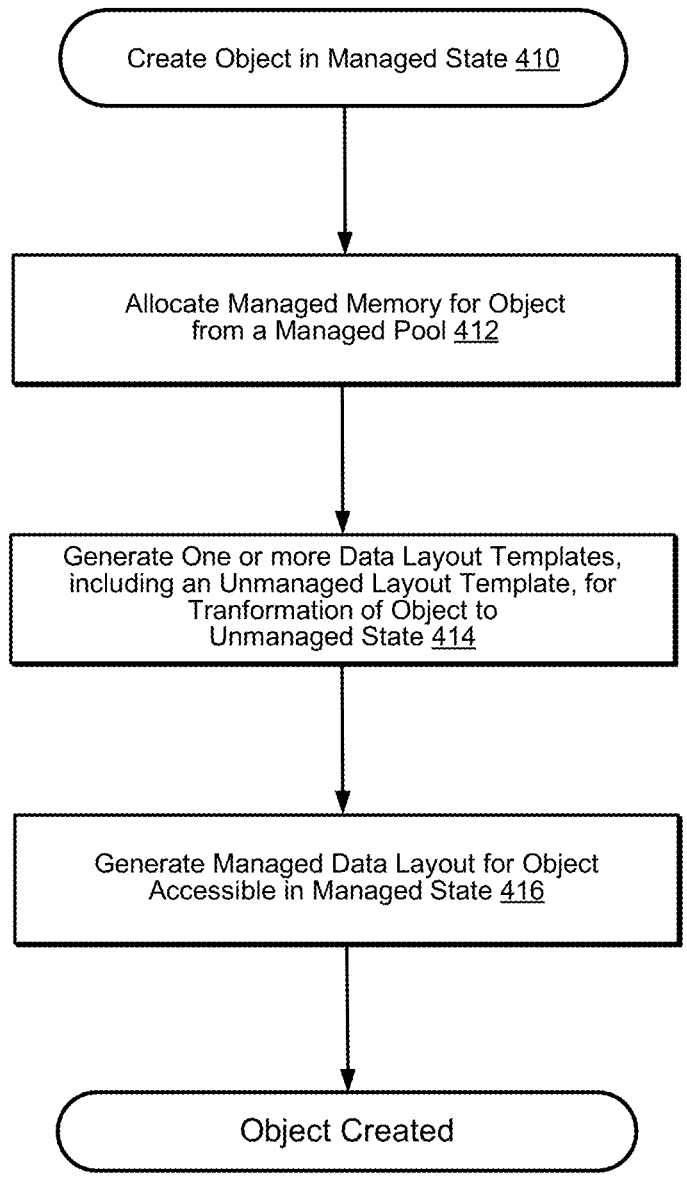

FIG. 4B is a flow diagram illustrating one embodiment of a method for creating an object in a Managed State such as in step 410 of FIG. 4A. The method starts at step 412 by allocating Managed Memory 190*a* for the Object 190 in a Managed Pool 148. The method then generates one or more Data Layout Templates, including an Unmanaged Data Layout Template 310 for the Object 190 in step 414. These templates may be used in transforming the Object 190 for access in an various states, such as discussed further below in FIG. 4C and FIG. 4E, and examples of these templates are provided above in FIG. 3. In some embodiments, these one or more Data Layout Templates may be generated each time an object is created in a Managed State while in other embodiments, the one or more Data Layout Templates may be created only the first time an object of a given type is created with the one or more Data Layout Templates for an object of a given type reused during the creation of additional objects of the same given type. Next, the method generates a managed data layout in the allocated managed memory 190*a* for the Object 190 to enable access to the Object 190 in a Managed State, as shown in step 416. Upon completion of step 416, the Object 190 has been created for access in a Managed State. It should be noted that while the Data Layout Templates are shown to be generated in step 420, this generation does not depend, nor is it a dependency of, any other steps in the method. Therefore, the generation of the Data Layout Templates may occur at any time during or prior to creation of the Object 190 in a Managed State and the example performing this generation in the sequence shown in FIG. 4B is not intended to be limiting.

Figure 4C:
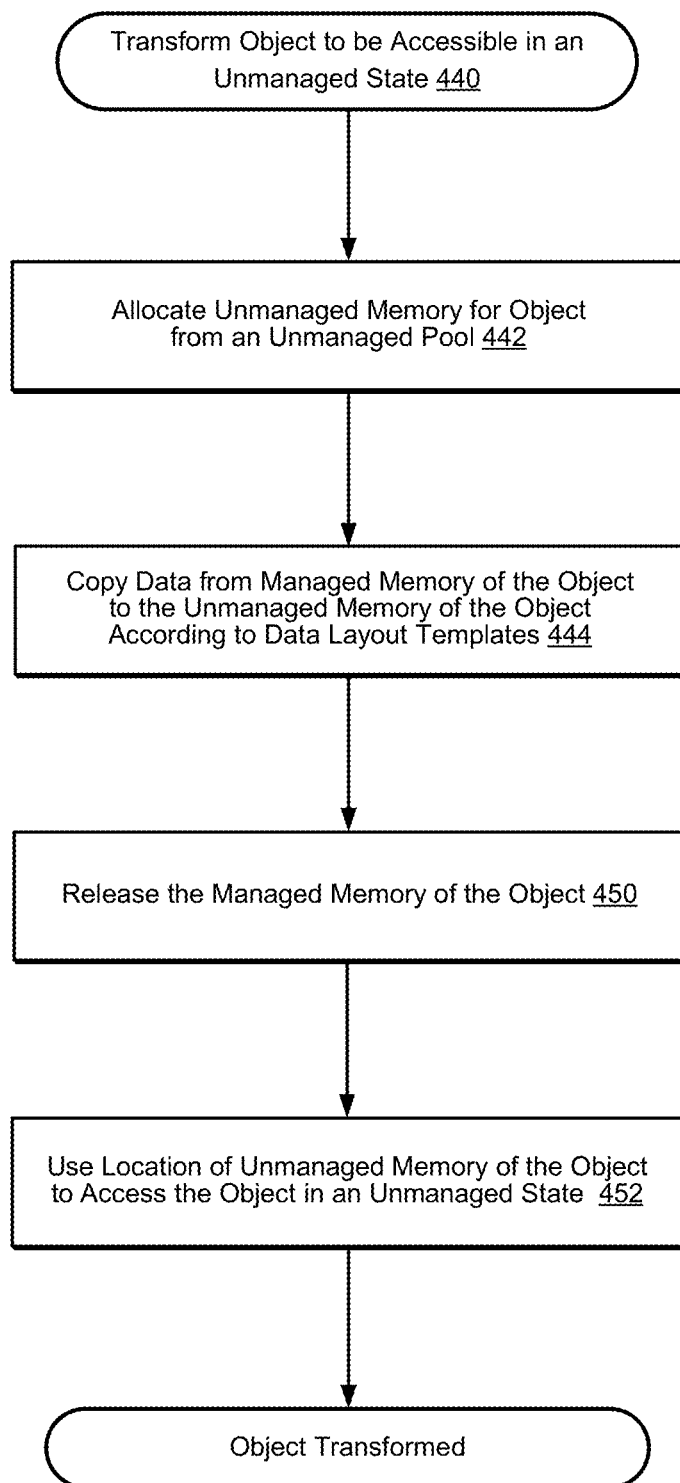

FIG. 4C is a flow diagram illustrating one embodiment of a method for transforming an object in a Managed State to an Unmanaged State such as in step 440 of FIG. 4A. The method starts at step 442 by allocating Unmanaged Memory 190*b* for the Object 190 in an Unmanaged Pool 158. The method then copies data from Managed Memory 190*a* of the Object 190 to the Unmanaged Memory 190*b* of the Object 190 according to Unmanaged Data Layout Template 302 in step 444. Further details of this copying step are discussed below in FIG. 4D. Once the data is copied, the method makes the Managed Memory 190*a* for the Object 190 available to be returned to the Managed Pool 148 in step 450. The Object 190 is then accessible in an Unmanaged State using the location of Object 190*b* in the Unmanaged Memory 190*b* as shown in step 452. Accesses to the Object 190 in an Unmanaged State may be performed by either Managed Code 160*a* or Unmanaged Code 160*b*, but accesses to the Object 190 in a Managed State may not be performed by Managed Code 160*a* as Managed Memory 190*a* has been returned to the Managed Pool 148. Furthermore, accesses to the Object 190 in the Unmanaged State may not benefit from the memory safety of a Managed State regardless of whether the accesses are performed by Managed Code 160*a* or Unmanaged Code 160*b*.

Figure 4D:
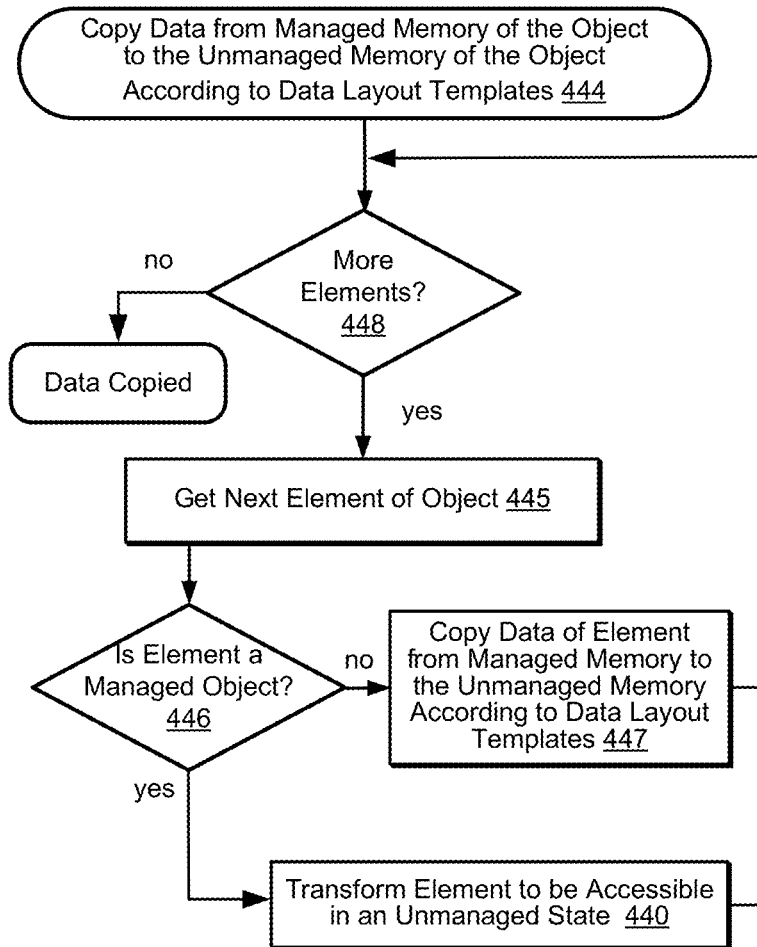

FIG. 4D is a flow diagram illustrating one embodiment of a method for copying data from managed memory of an object to unmanaged memory of the object such as in step 444 of FIG. 4C. The method begins by determining if additional elements in the object need to be copied in step 448. If additional elements exist, the method selects a next element of the object in step 445. The selected element is checked in step 446 to determine if it is a managed object. If the element is not a managed object, data for the element is copied from the managed memory to the unmanaged memory according to the managed and unmanaged data layout templates in step 447. If, on the other hand, the element is a managed object, the object is transformed to be accessible in the Unmanaged State in step 440 as show in FIG. 4C above. In addition, an element of a managed object may reference, or may contain a reference to, another object. In some embodiments, these references may be managed objects. In these embodiments, transforming the element in step 440 may include transforming the referenced object to be accessible in an Unmanaged State. In other embodiments, copying data of the element including the reference in step 447 may include transforming the referenced object to be accessible in an Unmanaged State. The method returns to step 448 to process the next element if additional elements exist. Once no additional elements exist, the method completes.

Figure 4E:
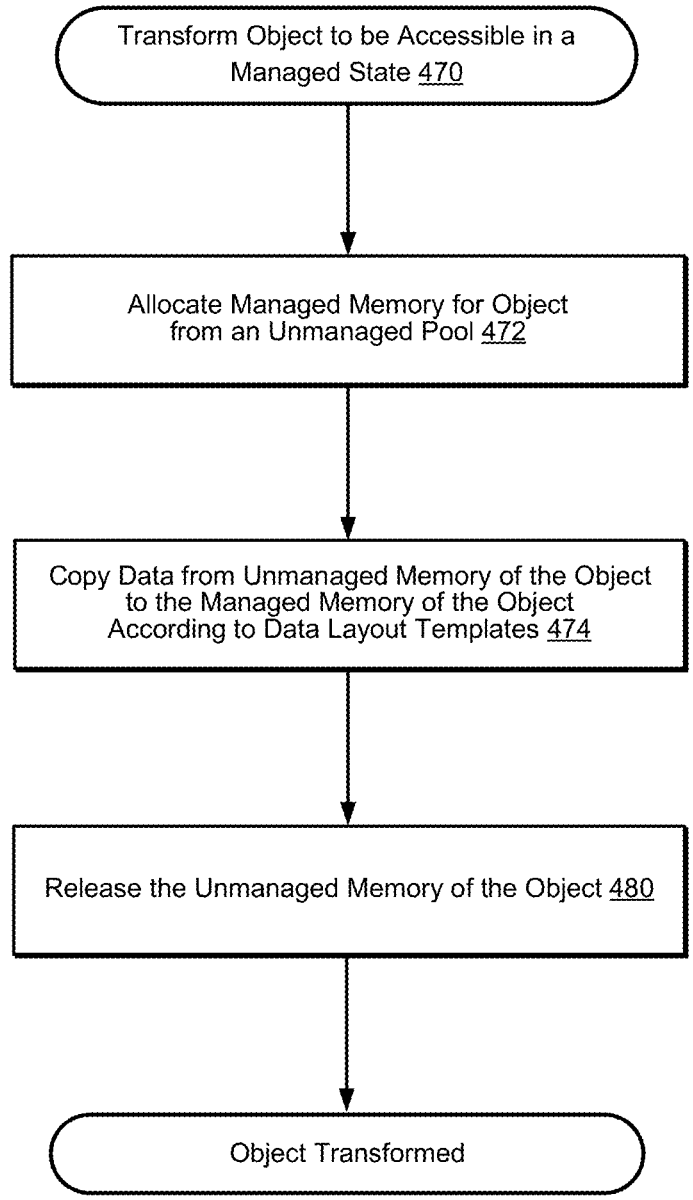

FIG. 4E is a flow diagram illustrating one embodiment of a method for transforming an object in an Unmanaged State to a Managed State such as in step 470 of FIG. 4A. The method starts at step 472 by allocating Managed Memory 190*a* for the Object 190 in a Managed Pool 148. The method then copies data from Unmanaged Memory 190*b* of the Object 190 to the Managed Memory 190*a* of the Object 190 according to a Managed Data Layout Template 300*a* in step 474. Further details of this copying step are discussed below in FIG. 4F. Once the data is copied, the method releases the Unmanaged Memory 190*b* for the Object 190 back to the Unmanaged Pool 158 in step 480. The Object 190 is then accessible in a Managed State. Accesses to the Object 190 in an Unmanaged State may not be performed by Unmanaged Code 160*b*. Furthermore, accesses to the Object 190 in the Managed State benefit from the memory safety of a Managed State.

Figure 4F:
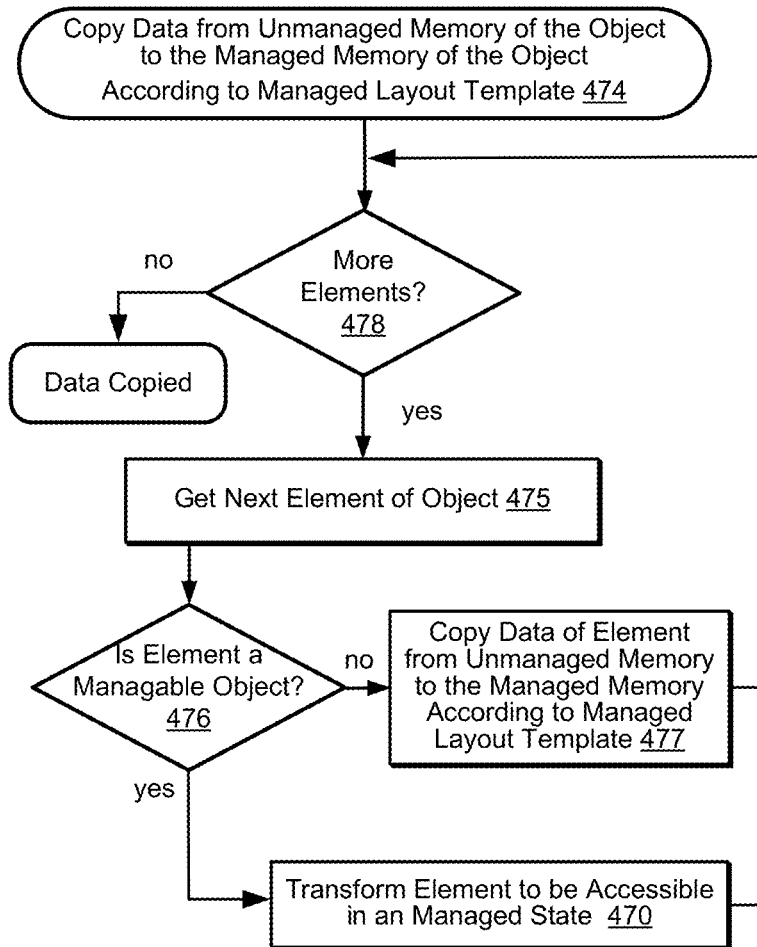

FIG. 4F is a flow diagram illustrating one embodiment of a method for copying data from unmanaged memory of an object to managed memory of the object such as in step 474 of FIG. 4E. The method begins by determining if additional elements in the object need to be copied in step 478. If additional elements exist, the method selects a next element of the object in step 475. The selected element is checked in step 476 to determine if the element is to be a managed object. If the element is not to be a managed object, data for the element is copied from the unmanaged memory to the managed memory according to the managed data layout template in step 477. If, on the other hand, the element is to be a managed object, the element is transformed to be accessible in the Managed State in step 470 as shown in FIG. 4E above. The method returns to step 478 to process the next element if additional elements exist. Once no additional elements exist, the method completes.

Some of the mechanisms described herein may be provided as a computer program product, or software, that may include a non-transitory, computer-readable storage medium having stored thereon instructions which may be used to program a computer system 500 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 500 may include one or more processors 560; each may include multiple cores, any of which may be single- or multi-threaded. For example, multiple processor cores may be included in a single processor chip (e.g., a single processor 560), and multiple processor chips may be included in computer system 500. Each of the processors 560 may include a cache or a hierarchy of caches 570, in various embodiments. For example, each processor chip 560 may include multiple L1 caches (e.g., one per processor core) and one or more other caches (which may be shared by the processor cores on a single processor).

Figure 5:
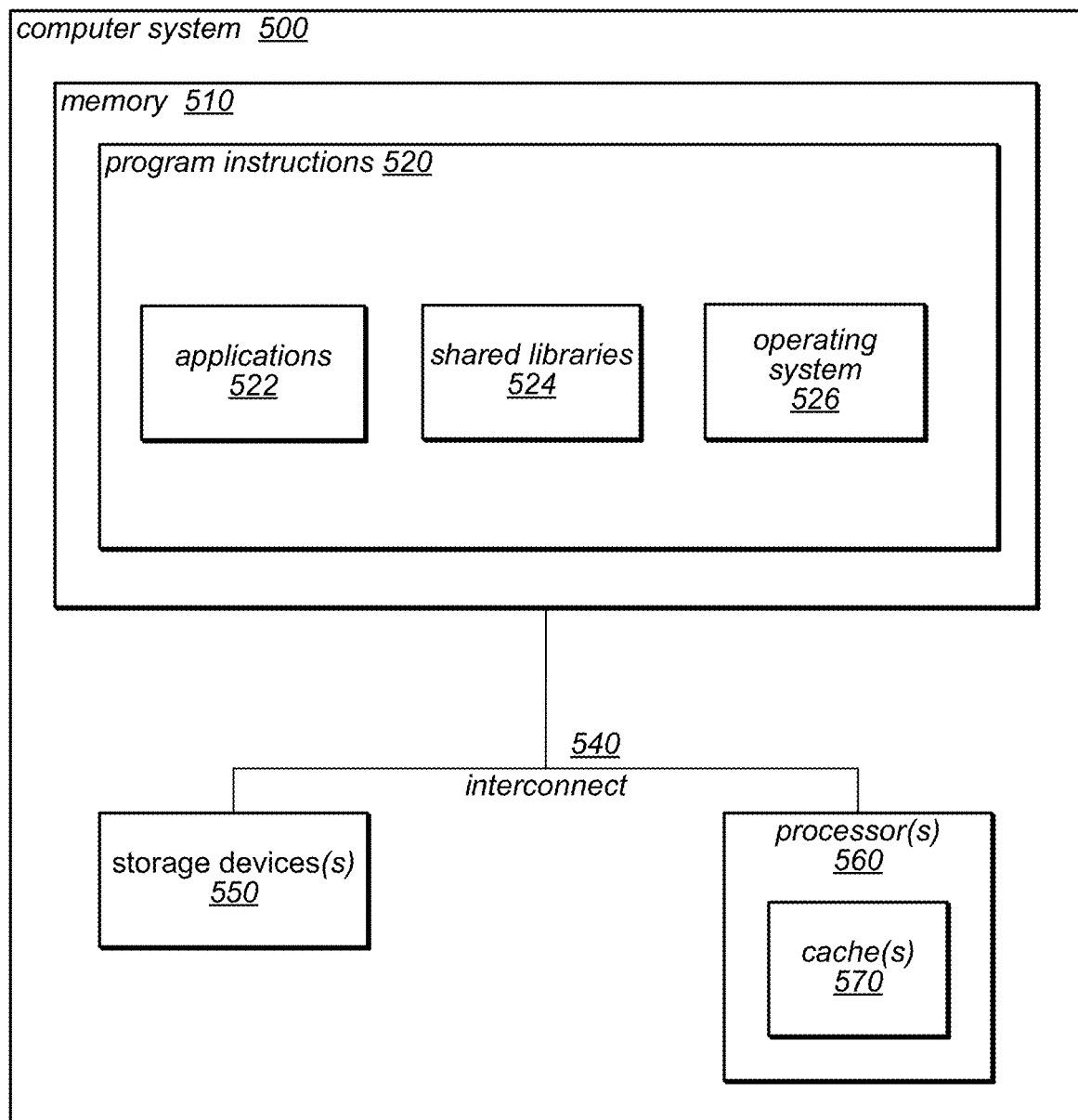
FIG. 5 is a block diagram illustrating one embodiment of a computing system that is configured to execute an application that includes both managed and unmanaged code, as described herein.

The computer system 500 may also include one or more storage devices 550 (e.g. optical storage, magnetic storage, hard drive, tape drive, solid state memory, etc.) and one or more system memories 510 (e.g., one or more of cache, SRAM, DRAM, RDRAM, EDO RAM, DDR RAM, SDRAM, Rambus RAM, EEPROM, etc.). In some embodiments, one or more of the storage device(s) 550 may be implemented as a module on a memory bus (e.g., on interconnect 540) that is similar in form and/or function to a single in-line memory module (SIMM) or to a dual in-line memory module (DIMM). Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 560, the storage device(s) 550, and the system memory 510 may be coupled to the system interconnect 540. One or more of the system memories 510 may contain program instructions 520 executable to implement one or more applications 522, shared libraries 524, and/or operating systems 526. These program instructions 520 may be encoded in platform unmanaged binary, any interpreted language such as Java™ byte-code, or in any other language such as C/C++, the Java™ programming language, etc., or in any combination thereof. In various embodiments, applications 522, operating system 526, and/or shared libraries 524 may each be implemented in any of various programming languages or methods or a combination of programming languages or methods. For example, in one embodiment, operating system 526 may be based on the Java™ programming language, while in other embodiments it may be written using the C or C++ programming languages. Similarly, applications 522 may be written using the Java™ programming language or another programming language or combination of programming languages as shown in FIG. 2 according to various embodiments. Moreover, in some embodiments, applications 522, operating system 526, and/ shared libraries 524 may not be implemented using the same programming language or languages. For example, applications 522 may be Java™ based, while shared libraries 524 may be developed using C.

In conclusion, methods, techniques and systems implementing an application execution engine for executing an application including both managed code and unmanaged code are disclosed. This application execution engine includes a hybrid data model that supports accesses to data object in both a Managed State and an Unmanaged State using managed and unmanaged data layout templates for directing transitions between managed and unmanaged layouts of data objects. During execution of an application and responsive to a request from managed code, the application execution engine creates an object in a Managed State and may additionally create managed and unmanaged layouts for the object. Responsive to a requirement for unmanaged code to access the created object accessible in the Managed State, the application execution engine transforms the object to be accessible in an Unmanaged State using an unmanaged data layout template. The application execution engine thus retains the advantages of managed data models, where possible, while allowing transitions to a binary-compatible representation where necessary for interoperating with native unmanaged code, thus enabling development of memory-safe applications that are capable of integrating with legacy code where source for the legacy code is not available to the application developer.

What is claimed:

1. A method, comprising:
   creating an object accessible in one of a plurality of states including a managed state and an unmanaged state, the object comprising an unmanaged layout template; and
   transforming the object from the managed state to the unmanaged state responsive to a requirement by unmanaged code to access the object, the transforming comprising:
      copying data from managed memory for the object to unmanaged memory for the object according to the unmanaged layout template; and
      using an address of the unmanaged memory for the object to access the object in the unmanaged state.

2. The method of claim 1, wherein subsequent to the transforming, the object is no longer accessible in the managed state.

3. The method of claim 1, wherein accesses by the managed code to the object accessible in the managed state are memory-safe.

4. The method of claim 1, wherein the object is created accessible in the managed state, the creating further comprising allocating managed memory for the object from a managed pool.

5. The method of claim 4, the transforming further comprising:
   transforming one or more other objects from the managed state to the unmanaged state; and
   releasing the managed memory for the object.

6. The method of claim 1, wherein the managed code comprises unmanaged program code executed in an emulation environment of a virtual machine.

7. The method of claim 1, further comprising:
   executing an application comprising program instructions that implement managed code and the unmanaged code, wherein the creating is performed responsive to a request from the managed code.

8. A system, comprising:
   one or more processors and a memory storing instructions that when executed cause the one or more processors to implement an application runtime configured to:
      create an object accessible in one of a plurality of states including a managed state and an unmanaged state, the object comprising an unmanaged layout template; and
      transform the object from the managed state to the unmanaged state responsive to a requirement by unmanaged code to access the object, wherein to transform the object the application runtime is configured to:
         copy data from managed memory for the object to unmanaged memory for the object according to the unmanaged layout template; and
         use an address of the unmanaged memory for the object to access the object in the unmanaged state.

9. The system of claim 8, wherein subsequent to the transforming, the object is no longer accessible in the managed state.

10. The system of claim 8, wherein accesses by the managed code to the object accessible in the managed state are memory-safe.

11. The system of claim 8, wherein the object is created accessible in the managed state, and wherein to create the object the application runtime is further configured to allocate managed memory for the object from a managed pool.

12. The system of claim 11, wherein to transform the object the application runtime is further configured to:
- transform one or more other objects from the managed state to the unmanaged state; and
- release the managed memory for the object.

13. The system of claim 8, wherein the managed code comprises unmanaged program code executed in an emulation environment of a virtual machine.

14. The system of claim 8, the application runtime further configured to:
- execute an application comprising program instructions that implement managed code and the unmanaged code, wherein the creating is performed responsive to a request from the managed code.

15. One or more non-transitory computer-accessible storage media storing program instructions that when executed on or across one or more processors cause the one or more processors to perform:
- creating an object accessible in one of a plurality of states including a managed state and an unmanaged state, the object comprising an unmanaged layout template; and
- transforming the object from the managed state to the unmanaged state responsive to a requirement by unmanaged code to access the object, the transforming comprising:
  - copying data from managed memory for the object to unmanaged memory for the object according to the unmanaged layout template; and
  - using an address of the unmanaged memory for the object to access the object in the unmanaged state.

16. The one or more non-transitory computer-accessible storage media of claim 15, wherein subsequent to the transforming, the object is no longer accessible in the managed state.

17. The one or more non-transitory computer-accessible storage media of claim 15, wherein accesses by the managed code to the object accessible in the managed state are memory-safe.

18. The one or more non-transitory computer-accessible storage media of claim 15, wherein the object is created accessible in the managed state, the creating further comprising allocating managed memory for the object from a managed pool.

19. The one or more non-transitory computer-accessible storage media of claim 18, the transforming further comprising:
- transforming one or more other objects from the managed state to the unmanaged state; and
- releasing the managed memory for the object.

20. The one or more non-transitory computer-accessible storage media of claim 15, further comprising:
- executing an application comprising program instructions that implement managed code and the unmanaged code, wherein the creating is performed responsive to a request from the managed code.

* * * * *